(12) United States Patent
Abruña et al.

(10) Patent No.: US 10,991,950 B2
(45) Date of Patent: Apr. 27, 2021

(54) STRUCTURALLY ORDERED NANOPARTICLES, METHODS AND APPLICATIONS

(71) Applicant: CORNELL UNIVERSITY, Ithaca, NY (US)

(72) Inventors: Héctor D. Abruña, Ithaca, NY (US); Francis J. DiSalvo, Ithaca, NY (US); David Muller, Ithaca, NY (US); Deli Wang, Ithaca, NY (US); Huolin Xin, Albany, CA (US)

(73) Assignee: CORNELL UNIVERSITY, Ithaca, NY (US)

( * ) Notice: Subject to any disclaimer, the term of this patent is extended or adjusted under 35 U.S.C. 154(b) by 499 days.

(21) Appl. No.: 14/433,399

(22) PCT Filed: Oct. 7, 2013

(86) PCT No.: PCT/US2013/063654
§ 371 (c)(1),
(2) Date: Apr. 3, 2015

(87) PCT Pub. No.: WO2014/058763
PCT Pub. Date: Apr. 17, 2014

(65) Prior Publication Data
US 2015/0249252 A1 Sep. 3, 2015

Related U.S. Application Data

(60) Provisional application No. 61/711,003, filed on Oct. 8, 2012.

(51) Int. Cl.
*H01M 4/86* (2006.01)
*H01M 4/92* (2006.01)
*H01M 8/1018* (2016.01)

(52) U.S. Cl.
CPC ........ *H01M 4/8657* (2013.01); *H01M 4/921* (2013.01); *H01M 4/926* (2013.01); *H01M 2008/1095* (2013.01)

(58) Field of Classification Search
None
See application file for complete search history.

(56) References Cited

U.S. PATENT DOCUMENTS 4,677,092 A * 6/1987 Luczak ............... B01J 23/8933
502/185
8,110,021 B2 2/2012 Zhong et al.
(Continued)

OTHER PUBLICATIONS

R. Callejas-Tovar et al. "Oxygen adsorption and surface segregation in (2 1 1) surfaces of Pt(shell)/<(core) and Pt3M (M=Co, Ir) alloys." Surface Science 602 (2008) 3531-3539.*
(Continued)

*Primary Examiner* — Alix E Eggerding
(74) *Attorney, Agent, or Firm* — Bond, Schoeneck & King, PLLC; Blaine Bettinger; George McGuire

(57) ABSTRACT

Embodiments provide a nanoparticle and a method for preparing the nanoparticle, as well as a membrane that includes the nanoparticle and a fuel cell that includes the membrane. The method comprises a thermal treatment method that provides from a nanoparticle comprising a structurally disordered material the nanoparticle comprising: (1) a structurally ordered core comprising a first material; and (2) a shell surrounding and further structurally aligned with the structurally ordered core and comprising a second material different from the first material. Particularly desirable is a nanoparticle comprising a $Pt_3Co@Pt/C$ structurally ordered core-shell composition supported upon a carbon support.

18 Claims, 9 Drawing Sheets

(56) References Cited

U.S. PATENT DOCUMENTS

| | | | |
|---|---|---|---|
| 2005/0238947 A1* | 10/2005 | Cho | H01M 4/8807 429/483 |
| 2010/0062929 A1 | 3/2010 | Virkar | |
| 2010/0092841 A1 | 4/2010 | Lopez et al. | |
| 2010/0310950 A1 | 12/2010 | Min et al. | |
| 2011/0124499 A1 | 5/2011 | Fang et al. | |
| 2011/0207019 A1* | 8/2011 | Mukerjee | H01M 4/921 429/487 |

OTHER PUBLICATIONS

M. Oezaslan et al. "Oxygen Electroreduction on Pt3C, PtCo and PtCo3 Alloy Nanoparticles for Alkaline and Acidic PEM Fuel Cells." Journal of the Electrochemical Society, 159 (4) B394-B405. (Year: 2012).*

Dai, J. et al. "Characterization, Stability, and Magnetic Properties of Bimetallic Pt3Co Nanoparticles." Metal-Oranic, and Non-Metal Chemistry, 41:1188-1192, 2011. (Year: 2011).*

Wang, D. et al. "Tuning Oxygen Reduction Reaction Activity via Controllable Dealloying: A Model Study of Ordered Cu3Pt/C Intermetallic Nanocatalysts." Nano Lett.201212105230-5238 Publication Date:Sep. 6, 2012 (Year: 2012).*

Suo et al. "First-Principles Considerations in the Design of Pd-Alloy Catalysts for Oxygen Reduction." Angew. Chem. Int. Ed. 2007, 46, 2862-2864. (Year: 2007).*

Mani, P. et al. "Dealloyed Pt-Cu Core-Shell Nanoparticle Electrocatalysts for Use in PEM Fuel Cell Cathodes." J. Phys. Chem. C 2008, 112, 2770-2778. (Year: 2008).*

Mehtap Oezaslan et al 2011 Meet. Abstr. MA2011-02 813 (Year: 2011).*

International Search Report and Written Opinion Form PCT/ISA/220, International Application No. PCT/US2013/063654, pp. 1-11, International Filing Date Oct. 7, 2013.

* cited by examiner

STRUCTURALLY ORDERED NANOPARTICLES, METHODS AND APPLICATIONS

CROSS-REFERENCE TO RELATED APPLICATION

This application is related to, and derives priority from, application Ser. No. 61/711,003, filed 8 Oct. 2012 and titled Structurally Ordered Nanoparticles, Methods and Applications, the content of which is incorporated herein fully by reference.

STATEMENT OF GOVERNMENT INTEREST

The research undertaken in support of the embodiments as disclosed herein, and the invention as claimed herein, was funded by the United States Department of Energy through grant number DE-FG02-87ER45298 and award number DE-SC0001086. The United States Government has rights in the invention as claimed herein.

BACKGROUND

1. Field of the Invention

Embodiments relate generally to structurally ordered nanoparticles, related methods for preparing the nanoparticles and related applications of the nanoparticles. More particularly embodiments relate to enhanced performance structurally ordered nanoparticles, related methods for preparing the nanoparticles and related applications of the nanoparticles.

2. Description of the Related Art

The sluggish kinetics of the oxygen reduction reaction (ORR) at a proton exchange membrane fuel cell cathode is one of the key challenges for the commercial viability of proton exchange membrane fuel cells, especially for transportation applications. In that regard, it is of great interest to explore more active catalysts, with superior performance and durability, than the traditionally employed carbon-supported Pt (Pt/C) nanoparticle based cathode catalysts.

Given the continued interest in proton exchange membrane fuel cells, thus desirable are proton exchange membrane fuel cell components with enhanced performance.

SUMMARY

Embodiments provide a core-shell structurally ordered intermetallic nanoparticle and a method for preparing the core-shell structurally ordered intermetallic nanoparticle. Embodiments also include a particular membrane that includes a particular core-shell structurally ordered intermetallic nanoparticle and a fuel cell that includes the particular membrane.

General embodiments provide mixed metal core-shell structurally ordered nanoparticles that include: (1) at least one precious transition metal (i.e., higher atomic weight, such as but not limited to Ru, Rh, Pd, Os, Ir and Pt) as a structurally ordered shell and a component of a structurally ordered intermetallic core; and (2) also at least one lighter transition metal (i.e., lower atomic weight, such as but not limited to Mn, Fe, Co, Ni and Cu) as an additional component within the structurally ordered intermetallic core.

Particular more specific embodiments demonstrate that core-shell structured Pt—Co nanoparticles, composed of $Pt_3Co$ ordered intermetallic cores with 2-3 atomic-layer Pt shells ($Pt_3Co$@Pt), can be prepared by a simple method to yield carbon supported core-shell structured Pt—Co nanoparticles ($Pt_3Co$@Pt/C). The Pt shell is strained to the ordered intermetallic core, which has a 0.8% smaller lattice constant than a disordered alloy. These nanoparticles exhibit generally high Pt mass activities for the ORR in comparison with related Pt—Co systems reported in the literature under similar testing conditions and with greatly enhanced durability. The foregoing properties make the embodied core-shell structured Pt—Co nanoparticles promising candidates for next generation proton exchange membrane fuel cells.

A particular method for preparing a nanoparticle in accordance with the embodiment includes providing a nanoparticle that comprises a structurally disordered material composition. The particular method also includes thermally treating the nanoparticle that comprises the structurally disordered material composition to provide a nanoparticle that comprises a structurally ordered material composition.

A particular nanoparticle in accordance with the embodiments includes a core comprising a first material arranged in a structurally ordered array. The particular nanoparticle also includes a shell surrounding the core and comprising a second material different from the first material and further structurally ordered with respect to the structurally ordered array.

A particular membrane in accordance with the embodiments includes a nanoparticle comprising: (1) a core comprising a first material arranged in a structurally ordered array; and (2) a shell surrounding the core and comprising a second material different from the first material and further structurally ordered with respect to the structurally ordered array.

A particular fuel cell in accordance with the embodiments includes a membrane comprising a nanoparticle comprising: (1) a core comprising a first material arranged in a structurally ordered array; and (2) a shell surrounding the core and comprising a second material different from the first material and further structurally ordered with respect to the structurally ordered array.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein.

DETAILED DESCRIPTION OF THE NON-LIMITING EMBODIMENTS

1. General Considerations

In accordance with further description below, the more specific embodiments are directed towards a Pt$_3$Co@Pt/C structurally ordered intermetallic nanoparticle supported on carbon, a method for preparing the nanoparticle, a membrane that includes the nanoparticle and a fuel cell that includes the membrane. The method in particular uses a thermal annealing of an infused mixture of platinum and cobalt salts with respect to a carbon support at a temperature of about 700 to about 1000° C. to provide the Pt$_3$Co@Pt/C structurally ordered intermetallic nanoparticle having a lattice parameter no greater than about 0.3915 nanometers, and more particularly no greater than about 0.3845 nanometers. However, the embodiments in general are not intended to be so limited.

Rather, the embodiments also contemplate structurally ordered nanoparticles supported on carbon other than Pt$_3$Co@Pt/C structurally ordered nanoparticles supported on carbon, and methods for preparing the structurally ordered nanoparticles other than the Pt$_3$Co@Pt/C structurally ordered nanoparticles. These other structurally ordered nanoparticles and related methods may be directed towards mixed metal core-shell structurally ordered nanoparticles that include: (1) at least one precious transition metal M1 (i.e., higher atomic weight, such as but not limited to Ru, Rh, Pd, Os, Ir and Pt) as a structurally ordered shell and a component of a structurally ordered intermetallic core; and (2) also at least one lighter transition metal M2 (i.e., lower atomic weight, such as but not limited to Mn, Fe, Co, Ni and Cu) as an additional component within the structurally ordered intermetallic core. The structurally ordered intermetallic core may be designated as M1$_x$M2$_y$ where x and y each separately range from 1 to 10.

A particular preparation methodology for preparing these additional core-shell structurally ordered nanoparticles may follow analogously with the $Pt_3Co@Pt/C$ structurally ordered nanoparticles described below, but with specific materials substitutions and thermal treatment timescales experimentally determined absent undue experimentation by a person of ordinary skill in the art. Similarly, the ordered character of the structurally ordered intermetallic nanoparticles may also additionally be characterized using methodology similar to that employed in accordance with the more specific embodiments as further described below.

Finally, within the context of a membrane in accordance with the embodiments and a fuel cell in accordance with the embodiments, such a membrane and a fuel cell may comprise additional components that are otherwise generally conventional, including but not limited to base resins, fillers and additives (i.e., with respect to a membrane) and carriers and electrodes (i.e., with respect to a fuel cell).

2. Specific Embodiments

Figure 1:
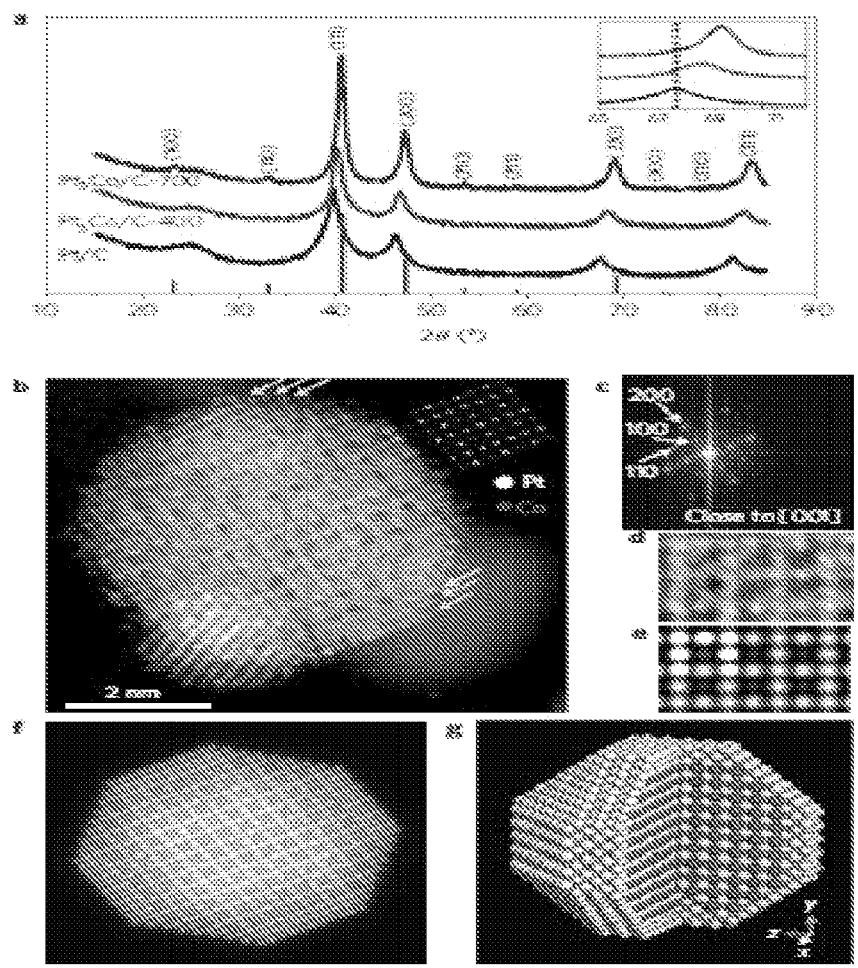
FIG. 1 shows XRD and HAADF-STEM images. (a) XRD patterns of Pt/C, $Pt_3Co$/C-400 and $Pt_3Co$/C-700. The inset in (a) shows the enlarged region of the Pt (220) diffraction peaks. The red (i.e., lighter shaded) vertical lines originating indicate the peak positions of the intermetallic $Pt_3Co$ reflections (PDF card #04-004-5243). (b) Atomic-resolution ADF-STEM image of $Pt_3Co$/C-700 after Richardson-Lucy deconvolution. A smaller particle (lower left) overlaps the larger particle in projection. The inset shows the projected unit cell along the [001] axis. (c) Diffractogram of the centre particle in (b). (d) A crop of the super lattice feature from (b). (e) The simulated ADF-STEM image of $L1_2$ ordered $Pt_3Co$ along [001] by a simple incoherent linear imaging model. (f) Multislice simulated ADF-STEM (100 kV, probe forming angle=27.8 mrad, ADF collection angles=98-295 mrad) image of the idealized nanoparticle as shown in (b). (g) The idealized atomic structure of the $Pt_3Co$ core—shell nanoparticle.

The structures of the carbon-supported $Pt_3Co$ nanoparticles ($Pt_3Co/C$) in accordance with the embodiments were controlled by pre-treatment of the as-prepared $Pt_3Co/C$, which was, in turn, synthesized using an impregnation-reduction method at different temperatures under a flowing $H_2/N_2$ mixed gas atmosphere. As shown in the X-ray diffraction (XRD) pattern of FIG. 1a, the sample, after pre-treatment at 400 C (denoted as $Pt_3Co/C$-400) showed typical Pt face-centered-cubic (fcc) features. The broad peak at around 25 degrees is attributed to the carbon support.

The other four diffraction peaks are consistent with those of pure Pt metals with an fcc structure, corresponding to the (111), (200), (220) and (311) planes.

The peak positions are shifted to higher angles, relative to Pt/C, indicating that Co is incorporated into the Pt fcc structure to form an alloy phase with a concomitant lattice contraction. One may use the $Pt_3Co/C$-400 sample as a reference for the traditional, disordered $Pt_3Co$ catalysts. After heat-treatment at 700 C (denoted as $Pt_3Co/C$-700), the XRD pattern showed pronounced (100) and (110) peaks characteristic of an ordered, intermetallic $Pt_3Co$ phase and a further 0.8% lattice contraction. See Table 1. The lattice parameter, calculated from the (220) diffraction peak position, and the average particle size, calculated using the full-width at half-maximum of the (220) diffraction and the Debye-Scherrer equation, are also presented in Table 1.

TABLE 1

XRD and E-Chem results of Pt/C and $Pt_3Co/C$.

| Sample | Particle size (nm) | Lattice parameter (nm) | $E_{1/2}$ (V)* | Mass activities[†] @0.9 V (mA$^{-1}$ μg$^{-1}$) | $t_k$ [‡] @0.9 V (mA$^{-1}$ cm$^{-2}$) |
|---|---|---|---|---|---|
| Pt/C | 4.4 ± 0.5 | 0.3916 | 0.875 | 0.06 | 0.09 |
| $Pt_3Co$-400 | 4.8 ± 1 | 0.3873 | 0.918 | 0.16 | 0.31 |
| $Pt_3Co$-700 | 7.2 ± 1 | 0.3841 | 0.945 | 0.52 | 1.10 |

*For ORR at room temperature, 0.1M $HClO_4$, 1,600 rpm, 5 mV s$^{-1}$.
[†]Mass activity.
[‡] Specific activity.

Figure 2:
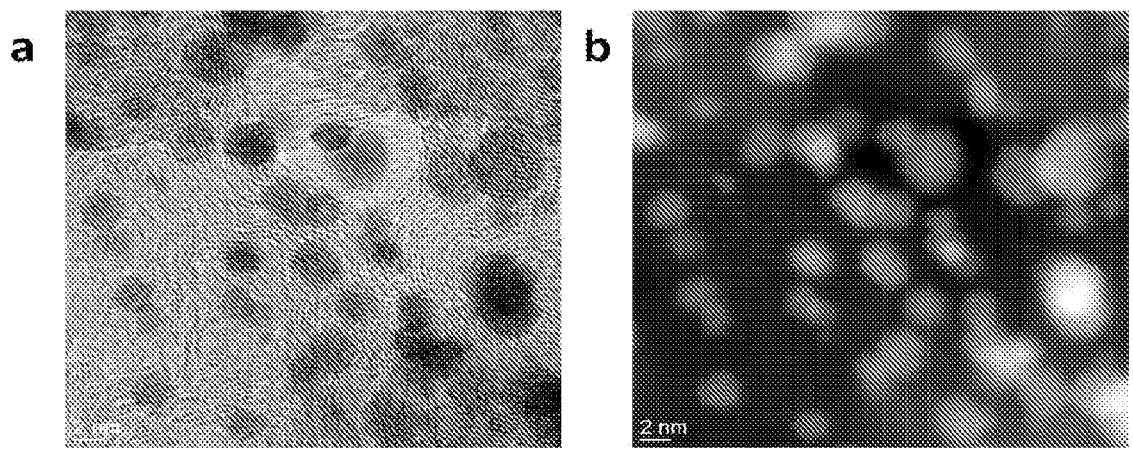
FIG. 2 shows bright-field (BF) (a) and annular dark-field (ADF) (b) STEM images of $Pt_3Co$/C-700 nanoparticles.
Figure 3:
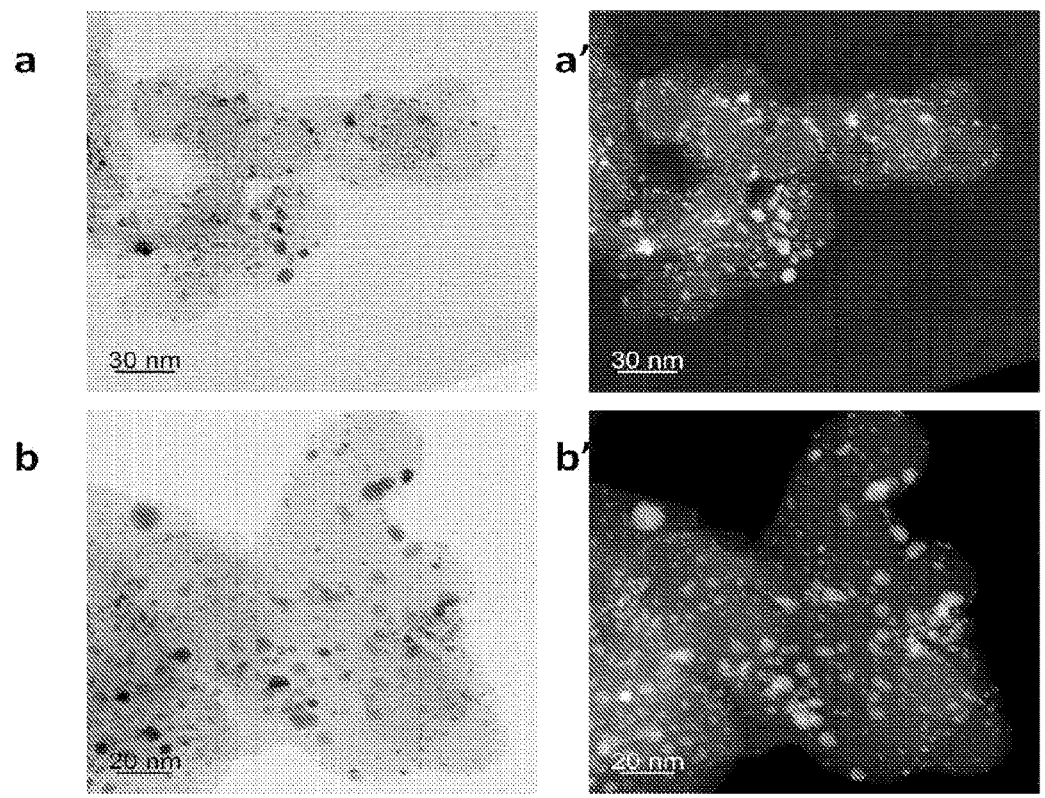
FIG. 3 shows two lower resolution STEM images of Pt$_3$Co/C-700 nanoparticles (a), (b), bright-field (BF) and (a'), (b'), annular dark-field (ADF) images.
Figure 4:
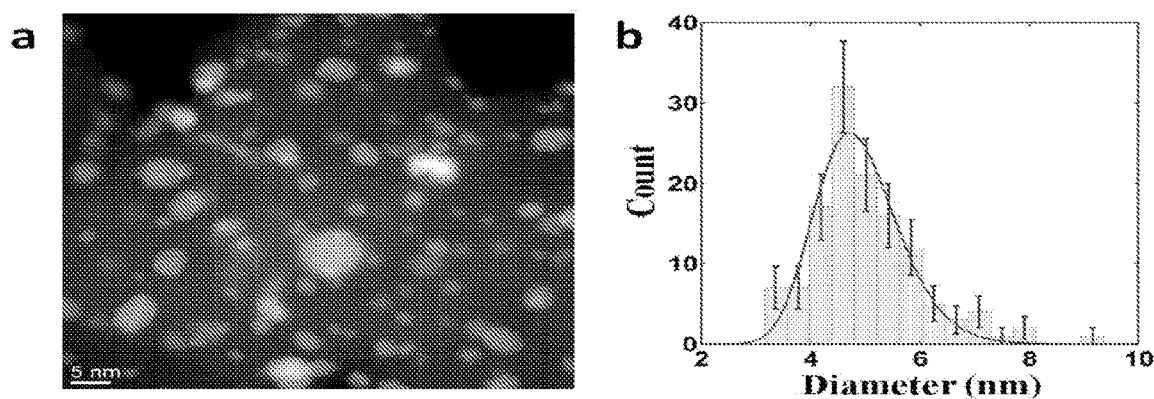
FIG. 4 shows (a) annular dark-field STEM overview image of Pt$_3$Co/C-700 made from an extended depth of field reconstruction. (b) Particle size distribution of more than 150 particles. A log-normal distribution fit to the histogram is shown in red (i.e., lighter shaded curve).
Figure 5:
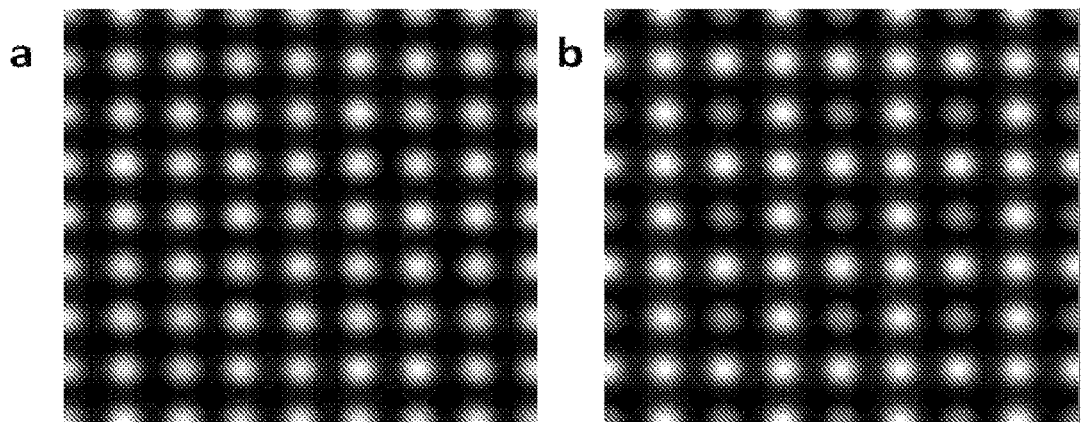
FIG. 5 shows comparison of the ADF-STEM image contrast for ordered and disordered Pt$_3$Co. Multislice simulation of (a) disordered alloy Pt$_3$Co. (b) L1,2 ordered intermetallic Pt$_3$Co (100 kV, Probe forming angle=27.8 mrad, ADF collection angle=98-295 mrad). The disordered Pt$_3$Co atom coordination was created from 4-by-4-by-12 super cell of L1,2 ordered Pt$_3$Co by swapping a randomly selected pair of atoms for 2×10$^7$ times. The simulation thickness for both (a) and (b) is 4.6 nm (xyz structure files are available upon request to HLX).
Figure 6:
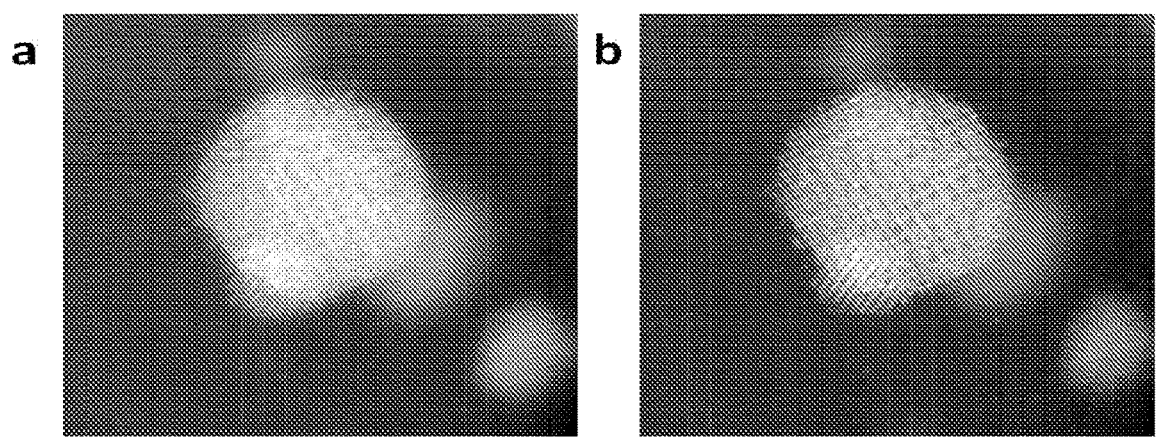
FIG. 6 shows comparison of the atomic-resolution ADF-STEM image of the nanoparticle shown in FIG. 1 before and after Richardson-Lucy deconvolution (4 iterations). The deconvolution kernel was assumed to be an Airy disk (100 kV, $\alpha_{max}$=28 mrad) convolved with a 0.8-Å Gaussian source. The deconvolution was done by a custom-written matlab script utilizing the native deconvlucy(I, PSF) function in the image processing toolbox (scripts are available upon request to HLX).

Bright-field and annular dark-field (ADF) images of $Pt_3Co/C$-700 simultaneously acquired in a fifth-order aberration-corrected scanning transmission electron microscope (STEM) operated at 60 kV are presented in FIG. 2 and FIG. 3. The images demonstrate that the majority of the particles stay well dispersed on the Vulcan carbon support after the 700 C heat treatment. The particle size distribution, calculated from more than 150 nanoparticles, as illustrated in FIG. 4, shows that the mean particle size is about 5 nm in diameter, which is slightly smaller than the value calculated from XRD because XRD gives volume-weighted measurements which tend to overestimate the geometric particle size. In the centre of FIG. 1b, a 5-nm $Pt_3Co$ nanoparticle is viewed along the [001] zone axis. Due to the unique super periods that are not present in the disordered alloy phase, the presence of the $L1_2$ ordered intermetallic structure in $Pt_3Co$ can be directly identified from atomic-resolution ADF-STEM images as illustrated in FIG. 5. For example, along the [001] axis, the projected $L1_2$ unit cell is composed of a periodic square array of pure Co columns surrounded by Pt columns at the edges and corners of each unit cell as illustrated in FIG. 1b, d. Because ADF-STEM images reflect the Z-contrast of materials, the Pt columns will have an intensity higher than that of the Co columns as illustrated in FIG. 1d, e. This differs from the disordered alloy phase, which has all columns with equal intensity and lacks the (001) super period, as illustrated in FIG. 5. Therefore, from the qualitative agreement of the simulation as illustrated in FIG. 1e with the experimental ADF-STEM image of the centre particle in FIG. 1b, d, one may confirm that the bulk of the nanoparticle is $L1_2$ ordered. It should also be noted that the first 2-3 atomic layers on the {100} facets as indicated by the yellow (i.e., lighter shaded) arrows in FIG. 1b seem free of the ordered super-lattice structure. The embodied image simulations indicate that they are probably pure Pt planes as illustrated in FIG. 1f, g. For detailed information on the simulation, see FIG. 6. One may demonstrate as below by two-dimensional (2D) atomic-scale aberration-corrected chemical mapping, that they are, in fact, Pt surface segregation layers, rather than a disordered $Pt_3Co$ alloy.

The chemical microstructure of the surface of the Pt-rich $Pt_3Co/C$-700 nanoparticles was examined using electron energy loss spectroscopic (EELS) mapping employing a fifth-order aberration-corrected STEM operated at 60 kV. FIG. 7a shows the ADF-STEM image of a $Pt_3Co/C$-700 nanoparticle that was spectroscopically imaged. FIG. 7b, c shows the Pt and Co projected distributions within the particle. The Pt (darker shaded red) versus Co (lighter shaded green) composite image FIG. 7d indicates that the $Pt_3Co$ core (yellow) is surrounded by a pure Pt shell. However, the outside of the particle is decorated by a small amount Co/Co oxide. The Co/Co oxides will not affect the electrocatalytic activity of these particles because they quickly dissolve in acid conditions. FIG. 7e shows the line extracted from the Pt and Co maps across the facet indicated by the arrows. It can be seen that the Pt shell thickness is about 0.5 nm, which is 2-3 atomic layers, in agreement with the ADF analysis in FIG. 1 and FIG. 8

Figure 9:
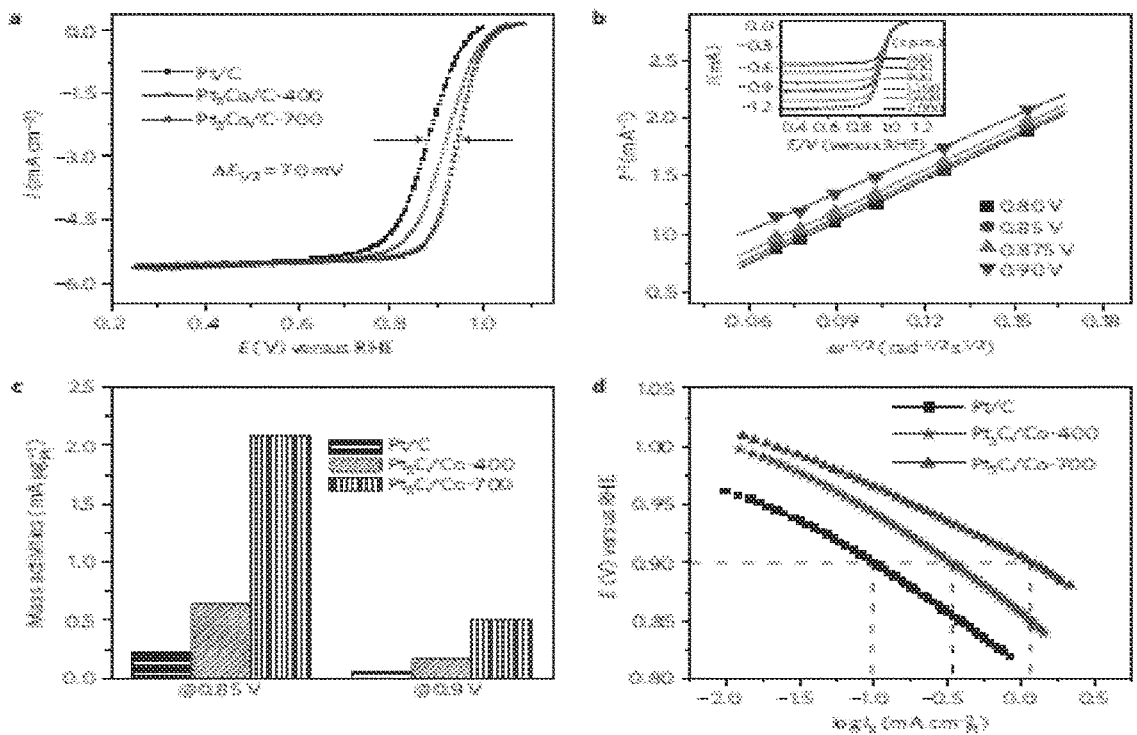
FIG. 9 shows electrochemical characterization. (a) ORR polarization curves for Pt/C, Pt$_3$Co/C-400 and Pt$_3$Co/C-700 in O2-saturated 0.1MHClO4 at room temperature, with rotation rate, 1,600 r.p.m. and sweep rate, 5 mVs$^{-1}$. (b) The Koutecky—Levich plots from ORR data for Pt$_3$Co/C-700 at different potentials. The inset in (b) shows the rotation-rate-dependent current—potential curves. (c) Comparison of mass activities for Pt/C, Pt$_3$Co/C-400 and Pt$_3$Co/C-700 at 0.85 and 0.9V. (d) Comparison of specific activities (Ik).

The polarization curves for the ORR obtained with Pt/C, $Pt_3Co/C$-400, and $Pt_3Co/C$-700 electrocatalysts as thin films on a rotating disk electrode (RDE) in an $O_2$-saturated 0.1 M HCl solution at 1,600 r.p.m. are shown in FIG. 9a. All electrodes were pre-treated by cycling the potential between +0.05 and −1.00V at a sweep rate of 50 mV s$^{-1}$ for 50 cycles to remove surface contamination before the ORR activity testing. One may observe from FIG. 9a that both $Pt_3Co/C$-400 and $Pt_3Co/C$-700 have similar ORR onset potentials, which are nearly 50 mV higher than for Pt/C. At higher overpotentials, the current reaches its diffusion-limited value, ~5.6 mA cm$^{-2}$. At lower overpotentials (+0.80 to +1.00V), the current approaches the mixed regime. In this region, the half-wave potential of an ORR polarization curve, $E_{1/2}$, is often used to evaluate the electrocatalytic activity of a catalyst. As listed in Table 1, the half-wave potential, $E_{1/2}$, increased in the sequence: Pt/C<Pt$_3$Co/C-400<Pt$_3$Co/C-700. The Pt$_3$Co/C-700 showed a marked positive shift in $E_{1/2}$ of ~70 mV relative to Pt/C. These data show that the intermetallic phase of Pt$_3$Co/C-700 exhibits marked activity improvements over Pt/C and disordered Pt$_3$Co/C-400 alloy catalysts. For a better understanding of the observed catalytic activities of the synthesized electrocatalysts for the ORR, the mass activities and specific activity at +0.85 and +0.90V were calculated on the basis of the ORR polarization curves and the amount of Pt or electrochemical surface area (ECSA) of Pt on the electrodes. The kinetic current ($I_k$) can be calculated using the Koutecky-Levich equation which is expressed by:

$$I = \frac{1}{I_k} + \frac{I}{I_d}$$

where I is the measured current and $I_d$ is the diffusion limited current. The $I_d$ term can be obtained from the Levich equation:

$$I_d = 0.62nFAD2/3v^{-1/6}\omega^{1/2}CO_2$$

Figure 10:
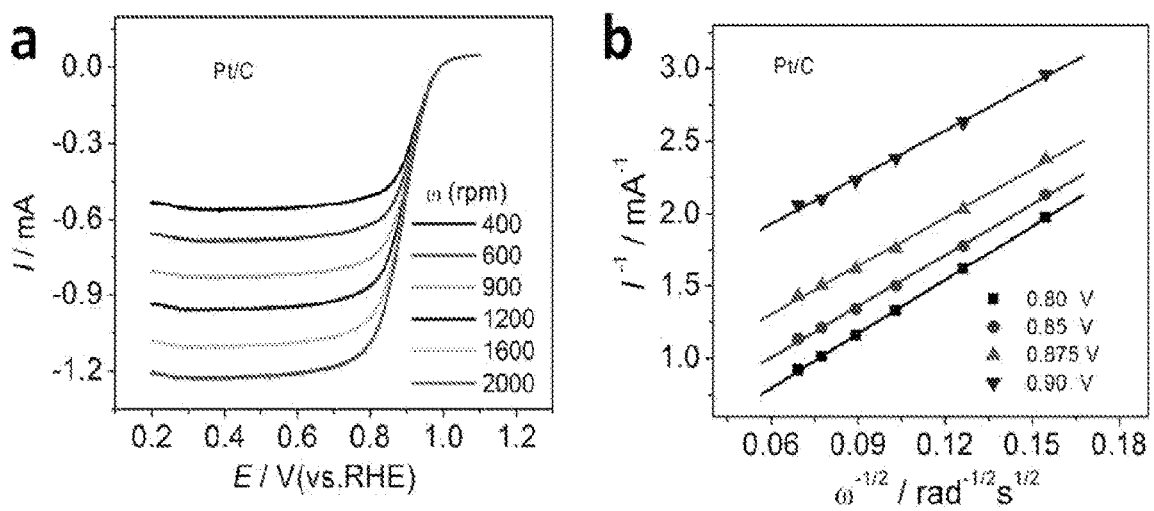
FIG. 10 shows (a) ORR polarization curves of Pt/C in O$_2$-saturated 0.1 M HClO$_4$ solution at a scan rate of 50 mVs$^{-1}$ and different rotation rates. (b) corresponding Koutecky-Levich plots at different potentials.
Figure 11:
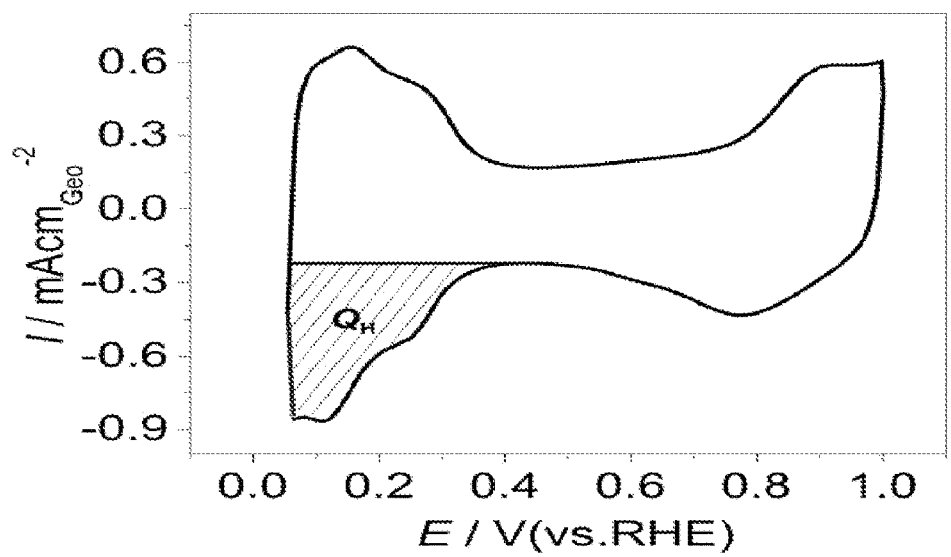
FIG. 11 shows representative CV curve of Pt$_3$Co/C for ECSA calculation. The CV curve was recorded from Pt$_3$Co/C-700 nanoparticles after 50 potential cycles between 0.05 to 1.0V (vs. RHE), in 0.1 M HClO$_4$ at a scan rate of 50 mVs$^{-1}$.

FIG. 9b shows the rotation-rate-dependent current-potential curves of the Pt$_3$Co/C-700 nanoparticles (similar curves for the Pt/C nanoparticles are given in FIG. 10). The number of electrons transferred (n) was calculated to be ~4.0 at 0.8-0.9V from the slopes of the Koutecky-Levich plots, indicating the nearly complete reduction of $O_2$ to $H_2O$ on the surface of the Pt$_3$Co/C-700 nanoparticles. The mass activity comparison of Pt/C, Pt$_3$Co/C-400, Pt$_3$Co/C-700 at +0.85 and +0.90V is shown in FIG. 9c, where one can see that Pt$_3$Co/C-700 exhibits much higher mass activity than pure Pt and Pt$_3$Co/C-400. Compared with the mass activity of Pt—Co/C systems tested under similar conditions at +0.90V reported in the literature, a Pt$_3$Co/C-700 catalyst in accordance with the embodiments exhibits one of the highest electrocatalytic activities for the ORR. FIG. 9d compares the specific activity ($I_k$) towards the ORR for Pt/C, Pt$_3$Co/C-400, and Pt$_3$Co/C-700 electrodes. The $I_k$ was obtained by normalizing the kinetic current to the ECSA, which was calculated by measuring the charge associated with the adsorption of hydrogen $H_{ads}$ ($Q_H$) between +0.05 and +0.40V, as illustrated in FIG. 11, and assuming a conversion factor of 200 μC cm$^{-2}$ for the adsorption of a monolayer of hydrogen. The measured currents were also corrected for mass transport to obtain the true kinetic currents. At +0.9V, the specific activity of Pt$_3$Co/C-700 was 1.1 mAcm$^{-2}$Pt, which is much higher than pure Pt and Pt$_3$Co/C-400.

Figure 7:
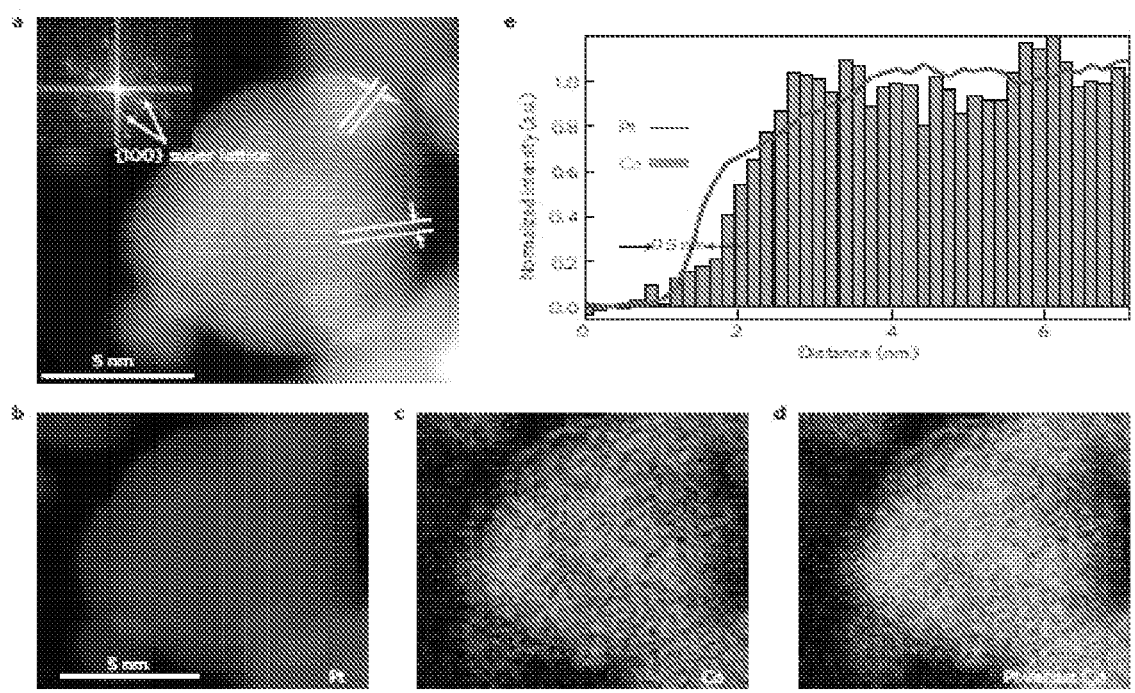
FIG. 7 shows ADF-STEM image of one nanoparticle and elemental mapping. (a) ADF-STEM image of a Pt$_3$Co/C-700 nanoparticle. (b-d) 2D EELS maps of Pt (b), Co (c) and the composite Pt versus Co map (d). (e) Line profiles extracted from (b), (c) across the facet indicated by the arrows showing that the Pt shell is 0.5 nm thick.
Figure 8:
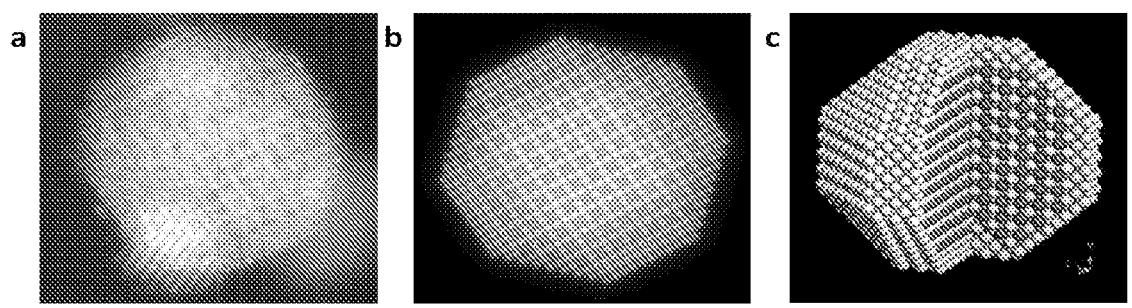
FIG. 8 shows comparison of the atomic-resolution ADF-STEM image of the nanoparticle shown in FIG. 1 with multislice simulation of an idealized Pt$_3$Co nanoparticle. (a) Experimental ADF-STEM image; (b) ADF-STEM (100 kV, Probe forming angle=27.8 mrad, ADF collection angle=98-295 mrad) image of the idealized nanoparticle as shown in (c) simulated using a multislice code. The resulting image was convolved with a 0.8-Å-FWHM Gaussian plus a 0.05-Å-FWHM Lorentzian to simulate the degradation of the image contrast due to a finite source size and chromatic aberrations; (c) the idealized atomic structure of the Pt$_3$Co core-shell nanoparticle. The distance between the three major facets ({111}, {001}{110}) were chosen to match the morphology of the particle shown in (a) rather than using a Wulff construction. (xyz/cif structure files are available upon sending request to HLX).
Figure 12:
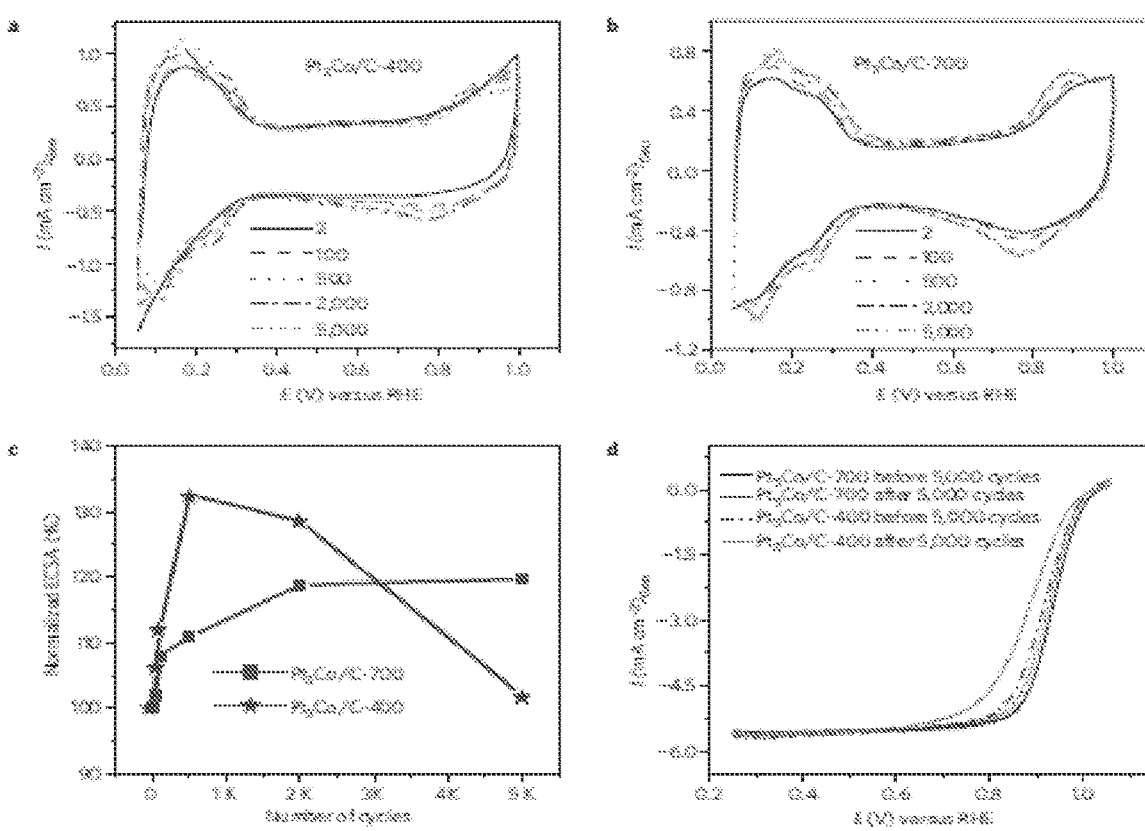
FIG. 12 shows characterization of the surface area changes and stability for ORR. (a), (b) Cyclic voltammetry curves of Pt$_3$Co/C-400 (a) and Pt$_3$Co/C-700 (b) nanoparticles in N2-purged 0.1 M HClO4 solution at room temperature for various numbers of potential cycles, as indicated, at a scan rate of 5 mVs$^{-1}$. (c) ECSA as a function of the number of cyclic voltammetry cycles for Pt$_3$Co/C-400 and Pt$_3$Co/C-700 catalysts. (d) Comparative ORR activities of Pt$_3$Co/C-400 and Pt$_3$Co/C-700 catalysts before and after 5,000 potential cycles.
Figure 13:
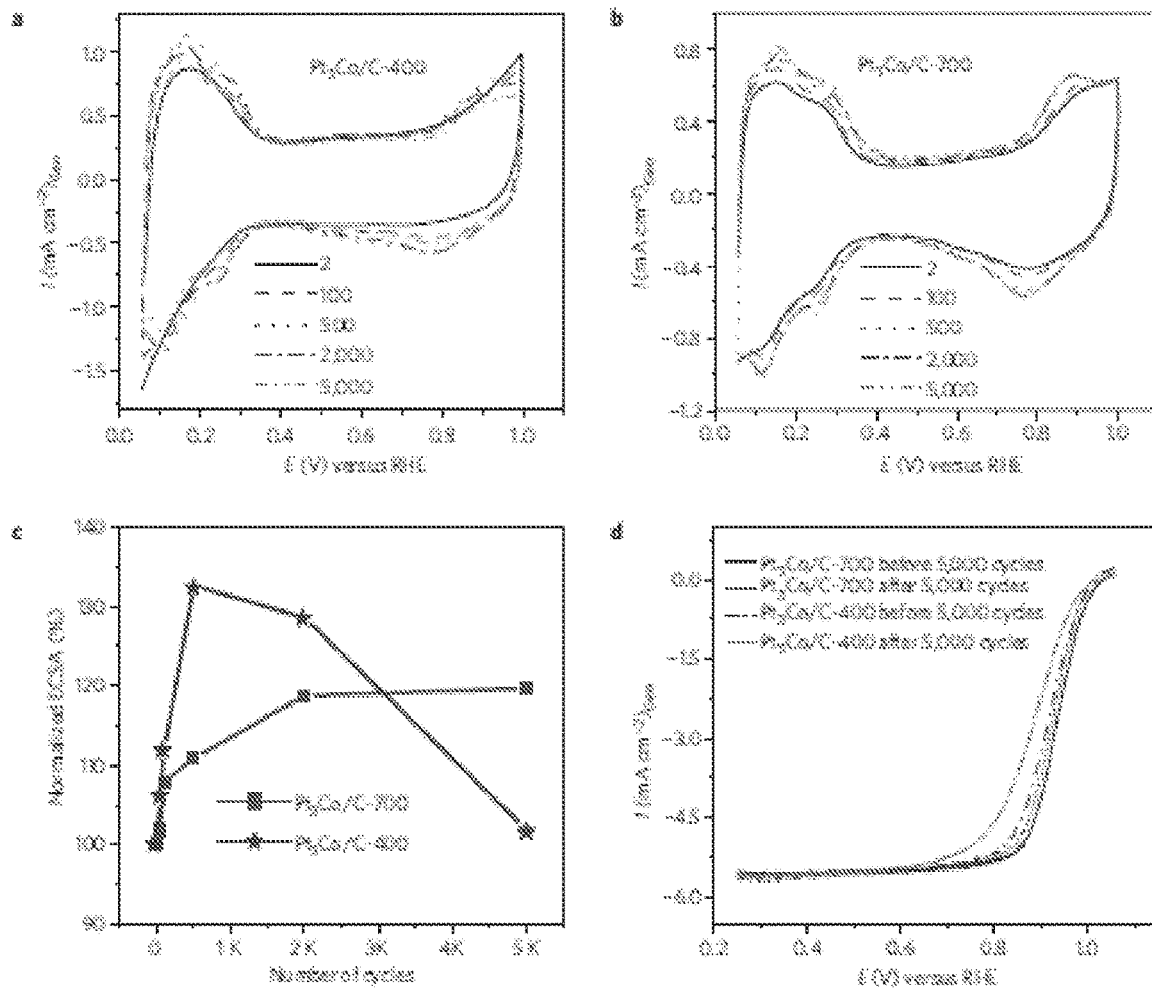
FIG. 13 shows the changes of CV curve of Pt$_3$Co/C-400 and Pt$_3$Co/C-700 during 50 potential cycles. The CV curves were recorded between 0.05 to 1.0V (vs. RHE), in 0.1 M HClO$_4$ at a scan rate of 50 mVs$^{-1}$.
Figure 14:
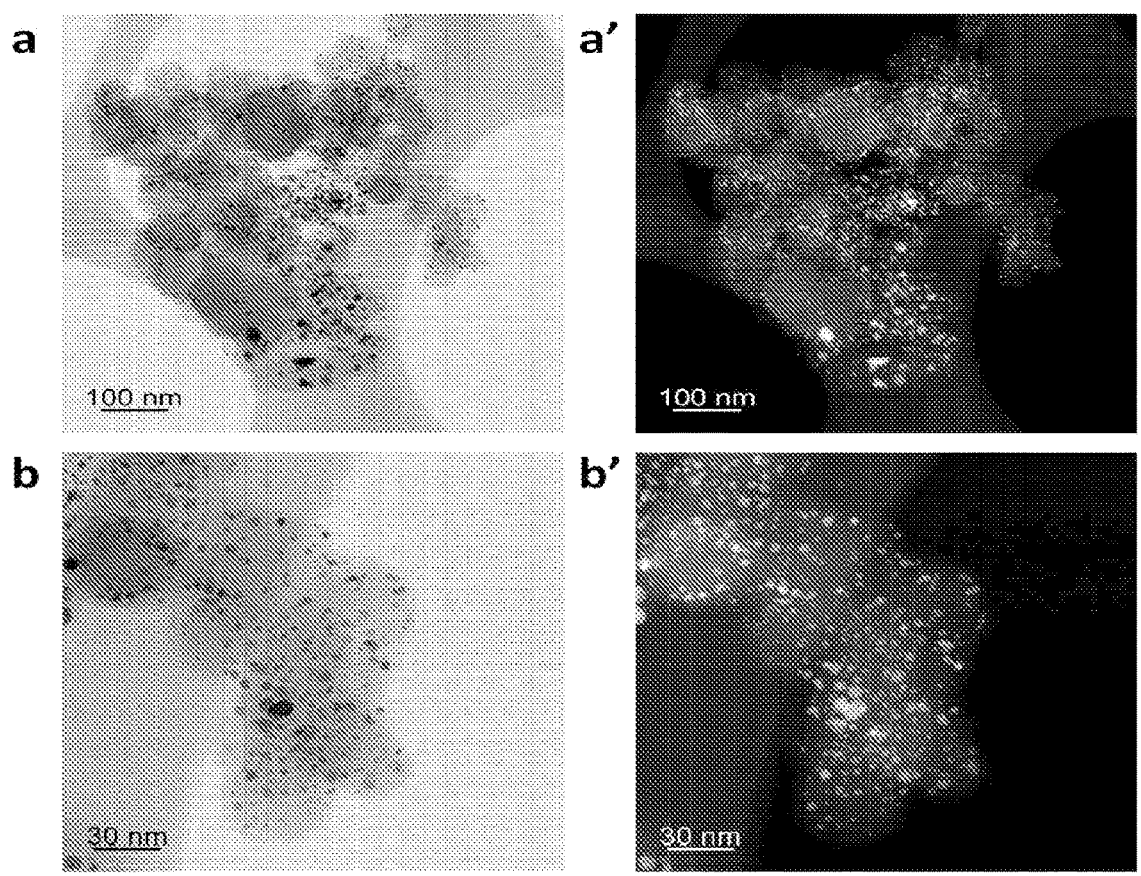
FIG. 14 shows two low resolution STEM images of Pt$_3$Co/C-700 nanoparticles after 5000 potential cycles between 0.05 to 1.0V (vs. RHE), in 0.1 M HClO$_4$ at a scan rate of 50 mVs$^{-1}$. (a), (b), bright-field (BF) and (a'), (b'), annular dark-field (ADF) images.
Figure 15:
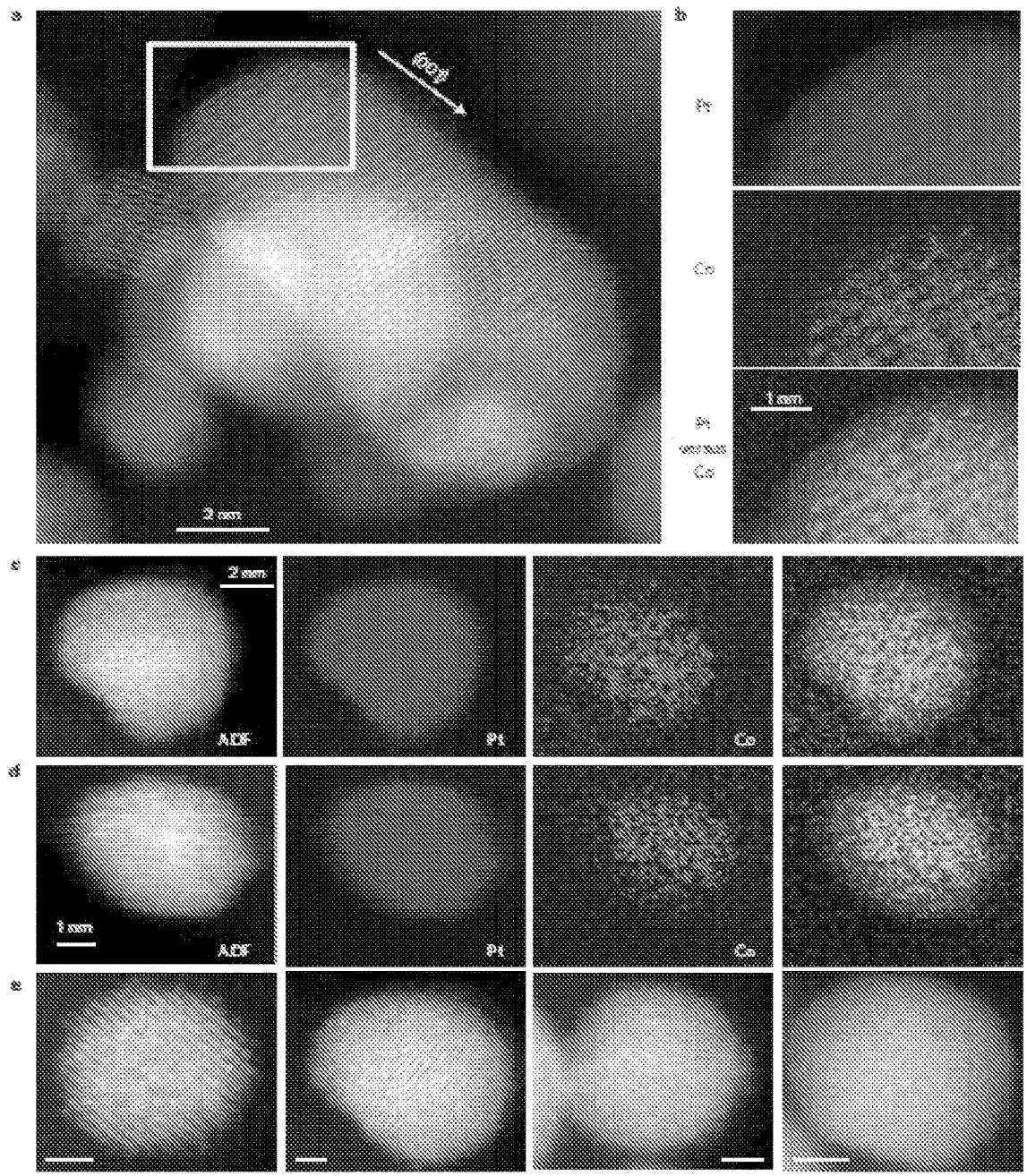
FIG. 15 shows structural stability. (a) ADF-STEM image of a Pt$_3$Co/C-700 nanoparticles after 5,000 electrochemical cycles. (b) EELS maps of Pt, Co and the composite Pt versus Co map from the selected region in (a). (c), (d) Two more particles and their Pt, Co elemental mapping to show the Pt-rich shell and PtCo intermetallic core after electrochemical cycling. (e) Further particles demonstrating that the ordered structure is maintained after electrochemical cycling. Scale bars, 1 nm.

The durability of the catalysts was evaluated by potential cycling between +0.05 and +1.00V for 5,000 cycles in an $N_2$ saturated 0.1 M HClO$_4$ solution at a scan rate of 50 mV s$^{-1}$. The cyclic voltammograms of Pt$_3$Co/C-400 and Pt$_3$Co/C-700 nanoparticles obtained after 2, 100, 500, 2,000, and 5,000 cycles are shown in FIG. 12a, b. For the Pt$_3$Co/C-400 nanoparticles, there were no well-defined hydrogen adsorption/desorption peaks after the first 100 cycles (see also FIG. 13). With continued cycling, the hydrogen adsorption/desorption peaks, as well as the Pt oxides reduction peaks, become prominent, as illustrated in FIG. 12a. This suggests that initially the behavior of the Pt$_3$Co/C-400 nanoparticles was dominated by the Pt—Co alloy and that cobalt was gradually leached away, leaving a Pt-rich surface. However this was not the case for Pt$_3$Co/C-700 nanoparticles. Even the second cyclic voltammetry cycle exhibited two prominent hydrogen adsorption/desorption peaks, along with the Pt oxides formation/reduction peaks, as illustrated in FIG. 12b, indicating that the Pt$_3$Co/C-700 nanoparticle surfaces were Pt-rich right after preparation. The peak currents increased slightly with potential cycling, as illustrated in FIG. 12b, indicating that some Co/Co oxides on the catalyst surface dissolved with potential cycling, exposing further Pt on the surface. This result agrees with our ADF-STEM and STEM-EELS images, which indicate that there is a small amount of Co/Co oxides decorating the Pt-rich surface of the Pt$_3$Co/C-700 nanoparticles. The ECSAs of Pt$_3$Co/C-400 and Pt$_3$Co/C-700, after a given number of potential cycles, are shown in FIG. 12c. It can be seen that both Pt$_3$Co/C-400 and Pt$_3$Co/C-700 show an increased ECSA in the first few cycles, which could be attributed to surface roughening and removal of contaminants from the sample surface, since the hydrogen adsorption/desorption peaks became more prominent. The ECSA of Pt$_3$Co/C-400 reached a maximum value after 500 cycles, then decreased rapidly with further cycling. After 5,000 cycles, the ECSA had decayed by about 30% of its maximum value. However, for the Pt$_3$Co/C-700 catalyst, the ECSA increased by about 20% after 2,000 cycles, and then stabilized. After 5,000 potential cycles, the Pt$_3$Co/C-400 catalyst showed a degradation of more than 30 mV in its half-wave potential $E_{1/2}$ as illustrated in FIG. 12d, while the degradation of the Pt$_3$Co/C-700 catalyst was much lower, with less than a 10 mV negative shift in the half-wave potential, indicating that the structurally ordered intermetallic Pt$_3$Co/C was much more durable and stable than the disordered Pt$_3$Co/C alloy. Furthermore, most of the particles were still well-dispersed on the carbon support, as illustrated in FIG. 14. The structural stability of Pt$_3$Co/C-700 nanoparticles after 5,000 electrochemical cycles was verified by ADF-STEM images and EELS elemental mapping, as illustrated in FIG. 15. As shown in FIG. 15a, although some of the particles coalesced and/or aggregated (a), the Pt-rich shell (b, d) and ordered intermetallic core (a, e) structure were preserved. Compared with the ADF-STEM images and EELS elemental mapping of Pt$_3$Co/C-700 nanoparticles before potential cycling as illustrated in FIG. 7, there are no Co/Co oxides left on the surface and the Pt-rich shell can be clearly seen in FIG. 7b-d.

In summary, this work presents a new kind of electrocatalyst for the ORR, composed of ordered, intermetallic core-shell Pt$_3$Co@Pt/C nanoparticles. These nanoparticles are more active and durable than the disordered Pt$_3$Co/C alloy and could represent the next-generation ORR electrocatalyst for fuel-cell applications. The high activity and durability of the electrocatalyst for the ORR can be ascribed to the Pt-rich shell and the stable intermetallic Pt, Co arrangement in the core. This study provides a new design strategy for preparing fuel-cell catalysts with both excellent electrocatalytic activity and stability.

3. Experimental Methods

A. Sample Preparation.

The carbon-supported Pt/C and Pt$_3$Co/C nanoparticles were prepared using an impregnation method. In a typical synthesis, 53.3 mg of H$_2$PtCl$_6$.6H$_2$O and 8.2 mg of CoCl$_2$.6H$_2$O were dissolved in deionized water, and 78 mg of Vulcan XC-72 carbon support were dispersed in it. After ultrasonic mixing for 30 min, the suspension was heated under magnetic stifling to allow the solvent to evaporate and form a smooth, thick slurry. The slurry was dried in an oven at 60 C. After being ground in an agate mortar, the resulting dark and free-flowing powder was heated in a tube furnace at 150 C under flowing $H_2/N_2$ for 2 h. Finally, the powder was cooled to room temperature under $N_2$. The as-prepared $Pt_3Co/C$ catalysts were then annealed at 400 C and 700 C under an $H_2$ atmosphere for 2 hours. These samples are denoted as $Pt_3Co/C$-400 and $Pt_3Co/C$-700, respectively.

B. Characterization.

The as-prepared catalysts were characterized by powder XRD using a Rigaku Ultima VI diffractometer, and diffraction patterns were collected at a scanning rate of 5 degrees min−1 and with a step of 0.02 degrees. TEM was performed using a Shottky-field-emission-gun Tecnai F20 operated at 200 kV. The EELS maps were acquired on a fifth-order aberration-corrected STEM (Cornell Nion UltraSTEM) operated at 60 kV ($\alpha_{max \sim 30}$ mrad). Under such conditions, a real-space resolution of 1.3 Å and a reciprocal-space information transfer, up to 1.18 Å can be routinely achieved. The method of extracting Pt and Co maps from the EELS spectroscopic images is generally conventional as described in a previous publication. The atomic-resolution ADF STEM images were recorded with this machine operated at 100 kV ($\alpha_{max=27.8}$ mrad). Sub-angstrom resolution is achievable at these operating conditions.

Particle size distributions were made from ADF-STEM images. Due to the limited depth of field of the aberration-corrected microscope, extended depth of field techniques were used to obtain a single projection image with all particles in focus. The particles were hand-segmented to determine particle areas from the projection image and diameters were estimated by assuming a spherical particle geometry.

C. Electrochemical Testing.

Electrochemical experiments were carried out in 0.1 M $HClO_4$ at room temperature using a Solartron model 1280 B electrochemistry station employing the analog sweep mode. Working electrodes were prepared by mixing the catalyst with Nafion (0.05 wt % Nafion dissolved in ethanol) solution. The mixture was sonicated and about 5.0 μl were applied onto a glassy carbon disk. After solvent evaporation, a thin layer of Nafion-catalyst-Vulcan ink remained on the glassy carbon surface to serve as the working electrode. The Pt loading on the RDE was calculated as 17:7 μgPt cm$^{-2}$. A Pt wire was used as the counter electrode and a reversible hydrogen electrode (RHE), in the same electrolyte as the electrochemical cell, was used as the reference electrode. All potentials are referred to RHE, and the readout currents were recorded without any iR drop correction during the measurements. Since one may use a Luggin capillary type RHE, the Q3 ohmic drop in the solution is negligible. For the ECSA study, cyclic voltammetry was conducted over a potential range from +0.05V to +1.00V at a scan rate of 50 mVs$^{-1}$ in 0.1 M $HClO_4$. ECSA values were calculated by integrating the area under the curve for the hydrogen adsorption/desorption region between +0.05 and +0.40V for the reverse sweep in the cyclic voltammetry and using a conversion factor of 200 μC cm$^2$. The ORR polarization curves were obtained by sweeping the potential from +0.20 to +1.10V at a scan rate of 5 mVs$^{-1}$ and at a rotation rate of 1,600 r.p.m. The kinetic current ($I_k$) can be calculated using the Koutecky-Levich equation which is expressed by:

$$I = \frac{1}{I_k} + \frac{I}{I_d}$$

where I is the measured current and $I_d$ the diffusion limited current. The $I_d$ term can be obtained from the Levich equation:

$$I_d=0.62nFAD2/3v^{-1/6}\omega^{1/2}CO_2$$

where n is the number of electrons transferred; F is Faraday's constant (96,485 C mol$^{-1}$); A is the area of the electrode (0:196 cm$^2$); D is the diffusion coefficient of $O_2$ in 0.1 M $HClO_4$ solution (1:93 10-5 cm$^2$ s$^{-1}$); v is the kinematic viscosity of the electrolyte (1:01×10−2cm$^2$ s$^{-1}$); ω is the angular frequency of rotation, ω=2πf/60, f is the RDE rotation rate in r.p.m. and $CO_2$ is the concentration of molecular oxygen in 0.1 M $HClO_4$ solution (1.26×10$^{-6}$ mol cm$^{-3}$)

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A nanoparticle comprising:
   a core comprising a first material arranged in a structurally ordered array, the core comprising a $Pt_xCo_y$ intermetallic material; and
   a shell surrounding the core and comprising a second material different from the first material and further structurally ordered with respect to the structurally ordered array;

wherein the nanoparticle is substantially free of (211) X-ray diffraction peaks.

2. The nanoparticle of claim 1 wherein a lattice parameter of the structurally ordered array is no greater than about 0.3915 nanometers.

3. The nanoparticle of claim 1 further comprising a carbon carrier for the nanoparticle.

4. The nanoparticle of claim 1, wherein x and y each range from 1 to 10.

5. The nanoparticle of claim 1, wherein the nanoparticle shell comprises more than one layer.

6. The nanoparticle of claim 5, wherein the shell layer comprises 2-3 atomic layers of the second material.

7. The nanoparticle of claim 1, wherein one or more experimentally-derived X-ray diffraction peaks for the nanoparticle match X-ray diffraction peaks found in a Powder Diffraction File (PDF) for a pure sample of the first material.

8. The nanoparticle of claim 1, wherein a lattice parameter of the structurally ordered array is no greater than about 0.3845 nanometers.

9. A membrane comprising:
a nanoparticle comprising:
a core comprising a first material arranged in a structurally ordered array, the core comprising a $Pt_xCo_y$ intermetallic material; and
a shell surrounding the core and comprising a second material different from the first material and further structurally ordered with respect to the structurally ordered array;
wherein the nanoparticle is substantially free of (211) X-ray diffraction peaks.

10. The membrane of claim 9 wherein a lattice parameter of the structurally ordered array is no greater than about 0.3915 nanometers.

11. The membrane of claim 9, wherein x and y each range from 1 to 10.

12. The membrane of claim 9, wherein the nanoparticle shell comprises more than one layer.

13. A fuel cell comprising:
a membrane comprising a nanoparticle comprising:
a core comprising a first material arranged in a structurally ordered array, the core comprising a $Pt_xCo_y$ intermetallic material; and
a shell surrounding the core and comprising a second material different from the first material and further structurally arranged with respect to the structurally ordered array;
wherein the nanoparticle is substantially free of (211) X-ray diffraction peaks.

14. The fuel cell of claim 13 wherein a lattice parameter of the structurally ordered array is no greater than about 0.3915 nanometers.

15. The fuel cell of claim 13, wherein x and y each range from 1 to 10.

16. The fuel cell of claim 13, wherein the nanoparticle shell comprises more than one layer.

17. A nanoparticle comprising:
a core comprising a first material arranged in a structurally ordered array, the core comprising a $M1_xM2_y$ intermetallic material, where:
M1 includes at least one metal selected from the group consisting of Ru, Rh, Pd, Os, and Ir, and Pt; and
M2 includes at least one metal selected from the group consisting of Mn, Fe, Co, Ni, and Cu; and
a shell surrounding the core and comprising a second material different from the first material and further structurally ordered with respect to the structurally ordered array;
wherein the nanoparticle is substantially free of (211) X-ray diffraction peaks and comprises a (220) X-ray diffraction peak at about 69-70 degrees.

18. The nanoparticle of claim 17, wherein one or more experimentally-derived X-ray diffraction peaks for the nanoparticle match X-ray diffraction peaks found in a Powder Diffraction File (PDF) for a pure sample of the first material.

* * * * *